US 6,681,546 B2

(12) United States Patent
DeYoung et al.

(10) Patent No.: US 6,681,546 B2
(45) Date of Patent: Jan. 27, 2004

(54) TRAY SEALING MACHINE

(75) Inventors: Perry R. DeYoung, Ada, MI (US); Todd A. Sutton, Grand Rapids, MI (US); Scott D. Sikkema, East Grand Rapids, MI (US)

(73) Assignee: Oliver Products Company, Grand Rapids, MI (US)

( * ) Notice: Subject to any disclaimer, the term of this patent is extended or adjusted under 35 U.S.C. 154(b) by 0 days.

(21) Appl. No.: 10/322,887

(22) Filed: Dec. 18, 2002

(65) Prior Publication Data

US 2003/0084644 A1 May 8, 2003

Related U.S. Application Data

(62) Division of application No. 09/728,115, filed on Dec. 1, 2000, which is a continuation-in-part of application No. 09/599,827, filed on Jun. 22, 2000, now Pat. No. 6,499,271, which is a continuation-in-part of application No. 09/389,202, filed on Sep. 2, 1999, now abandoned, which is a continuation-in-part of application No. 09/103,859, filed on Jun. 24, 1998, now Pat. No. 5,946,887, which is a continuation of application No. 08/629,269, filed on Apr. 8, 1996, now Pat. No. 5,784,858.

(51) Int. Cl.$^7$ .............................................. B65B 51/10
(52) U.S. Cl. ...................................... 53/329.2; 53/373.7
(58) Field of Search ................................. 53/329, 329.2, 53/287, 478, 485, 390, 373.7

(56) References Cited

U.S. PATENT DOCUMENTS 3,283,469 A * 11/1966 McBrady et al. .............. 53/432
4,194,341 A * 3/1980 Kihnke et al. ................. 53/282
4,583,350 A * 4/1986 Artusi et al. .................. 53/478
5,784,858 A * 7/1998 Lastovich et al. ............. 53/329
5,946,887 A * 9/1999 Lastovich et al. ............. 53/329
6,499,271 B1 * 12/2002 Lastovich et al. ......... 53/329.2

OTHER PUBLICATIONS

PGPUB 20010000559 Deyoung et al, Dec. 1, 2000, entire document.*

* cited by examiner

Primary Examiner—Eugene L Kim
(74) Attorney, Agent, or Firm—Price, Heneveld, Cooper, DeWitt & Litton

(57) ABSTRACT

A sealing apparatus includes a frame structure including a base and an actuator support extending upward from the base, a container support including a container receiver, and a heater platen suspended from the actuator support above the container support. The heater platen is shiftable between a load/unload position wherein a container can be loaded into and unloaded from within the container receiver and an associated lid can be positioned over the container, and a sealing position wherein the heater platen presses the container and the lid on the container support. The sealing apparatus also includes an actuator that includes a support structure pivotally attached to the frame and supporting the heater platen, and an L-shaped handle having a first end, second end and a pivot point located between the first end and the second end. The handle is pivotable between a first position wherein the heater platen is in the load/unload position, and a second position wherein the heater platen is in the sealing position. The actuator also includes at least one pivot arm pivotally attached to the second of the handle and pivotally attached to the support structure such that rotating the handle with respect to the frame rotates the heater platen between the load/unload position and the sealing position.

16 Claims, 3 Drawing Sheets

TRAY SEALING MACHINE

CROSS-REFERENCE TO RELATED APPLICATION

This application is a divisional of U.S. patent application Ser. No. 09/728,115, filed Dec. 1, 2000, entitled TRAY SEALING MACHINE, which is a continuation-in-part of U.S. patent application Ser. No. 09/599,827 U.S. Pat. No. 6,499,271, filed on Jun. 22, 2000, entitled TRAY SEALING MACHINE, which is a continuation-in-part of U.S. patent application Ser. No. 09/389,202 ABN filed on Sep. 2, 1999, entitled DRAWER ACTION TRAY SEALING MACHINE, now abandoned which was a continuation-in-part of U.S. patent application Ser. No. 09/103,859 filed on Jun. 24, 1998, entitled DRAWER ACTION TRAY SEALING MACHINE, now U.S. Pat. No. 5,946,887, which is a continuation of U.S. patent application Ser. No. 08/629,269 filed on Apr. 8, 1996, entitled DRAWER ACTION TRAY SEALING MACHINE, now U.S. Pat. No. 5,784,858. Priority under 35 U.S.C. §120 is claimed to the filing dates of the '202, '859 and '269 applications and the entire disclosures of which are incorporated herein by reference.

BACKGROUND OF THE INVENTION

This invention relates to a machine for sealing a lid on a container, and more particularly for sealing food or the like within the container.

Food containers used by fast food establishments, grocery stores, delicatessens and the like, when filled on site, commonly employ a tray-type container integrally connected to a cover or lid. These containers are useful, but do not seal the food in or seal air out. Consequently, spillage readily occurs and retention of freshness is not possible. Another type of common container is that which has a separate lid which is snapped into place with the container. Some of this type are leak resistant, but do not completely seal the contents within the container. In large food processing establishments, containers can be completely sealed utilizing sealing machines which are presently known, but these typically are complex apparatuses, not suitable for on-site use in fast food restaurants, grocery stores, and the like. Further, persons employed at fast food establishments and the like are frequently young, relatively unskilled persons who work at a rapid pace. Turnover rate of employees is generally high, resulting in a high level of inexperience. Therefore, any mechanical devices to be used to close and seal containers at these establishments should be simple, easy and safe to use. There is needed an apparatus which meets these criteria as well as providing a leakproof or leak resistant container which also preserves freshness of the food item as well as assists in retaining heat within the food item.

One type of known apparatus usable in grocery stores to seal a polymeric film lid onto the top rim of a container for containing and transporting food, uses a heated platen. If the tray is plastic, it can be made leakproof and airtight. If it is paperboard, it can be made leak resistant. The apparatus involves a fixed lower support serving as a tray carrier and having a well or cavity to receive and retain a container therein, and an upper heated platen pivotally mounted to shift to a closed position on the container and lid between the platen and the lower support. The heated platen is manually forced down and held down by the weight of the human operator onto the container and lid during a time period while heat is applied to seal the lid to the container.

However, in order to provide sufficient force on the container and lid to fully compress the periphery of the two together, the heated upper platen must be manually forced down by the operator with a significant force which is usually about 20–40 pounds. By using leverage-type mechanical advantage, the force applied to the container and lid can be about 75 pounds. This exertion is required for each tray and lid, and for a set time period, in order to force the platen and tray carrier fully together. Establishments which would use these units frequently employ teenage persons or ladies, so that applying this significant amount of force steadily on the platen is difficult, requiring considerable exertion, and is particularly tiring. Moreover, it has been determined that even the application of this much force is sometimes not sufficient to assure a complete seal of the lid periphery to the container periphery. To be certain of sealing, the force should actually be several times this amount. One of the variables that can prevent total sealing is a non-uniform thickness of the flange of the tray about its periphery, thereby resulting in a poor seal at the thinner areas.

SUMMARY OF THE INVENTION

One aspect of the present invention is to provide a sealing apparatus that includes a frame including a base and an actuator support extending upward from the base, a container support including a container receiver, and a heater platen suspended from the actuator support above the container support. The heater platen in shiftable between a load/unload position, wherein a container can be loaded into and unloaded from within the container receiver and an associated lid can be positioned over the container, and a sealing position, wherein the heater platen presses the container and the lid on the container support. The sealing apparatus also includes an actuator that includes a support structure pivotally attached to the frame and supporting the heater platen, and an L-shaped handle having a first end, a second end, and a pivot point located between the first end and the second end. The handle is pivotable between a first position, wherein the heater platen is in the load/unload position, and a second position, wherein the heater platen is in the sealing position. The actuator further includes at least one pivot arm pivotally attached to the second end of the handle and pivotally attached to the support structure such that rotating the handle with respect to the frame rotates the heater platen between the load/unload position and the sealing position.

Another aspect of the present invention is to provide a sealing apparatus that includes a frame including a base and an actuator support extending upward from the base, a container support including a container receiver, and a heater platen suspended from the actuator support above the container support. The heater platen is shiftable between a load/unload position, wherein a container can be loaded into and unloaded from within the container receiver and an associated lid can be positioned over the container, and a sealing position, wherein the heater platen presses the container and the lid on the container support. The sealing apparatus also includes an actuator including a linkage adapted to receive an input force and to generate an output force. The linkage is mechanically linked to the platen such that the output force of the linkage is received by the platen causing the platen to apply a force against the container support that is at least five times the amount of the input force exerted on the actuator.

These and other features, advantages, and objects of the present invention will be further understood and appreciated by those skilled in the art by reference to the following specification, claims, and appended drawings.

DESCRIPTION OF THE PREFERRED EMBODIMENTS

Figure 1:
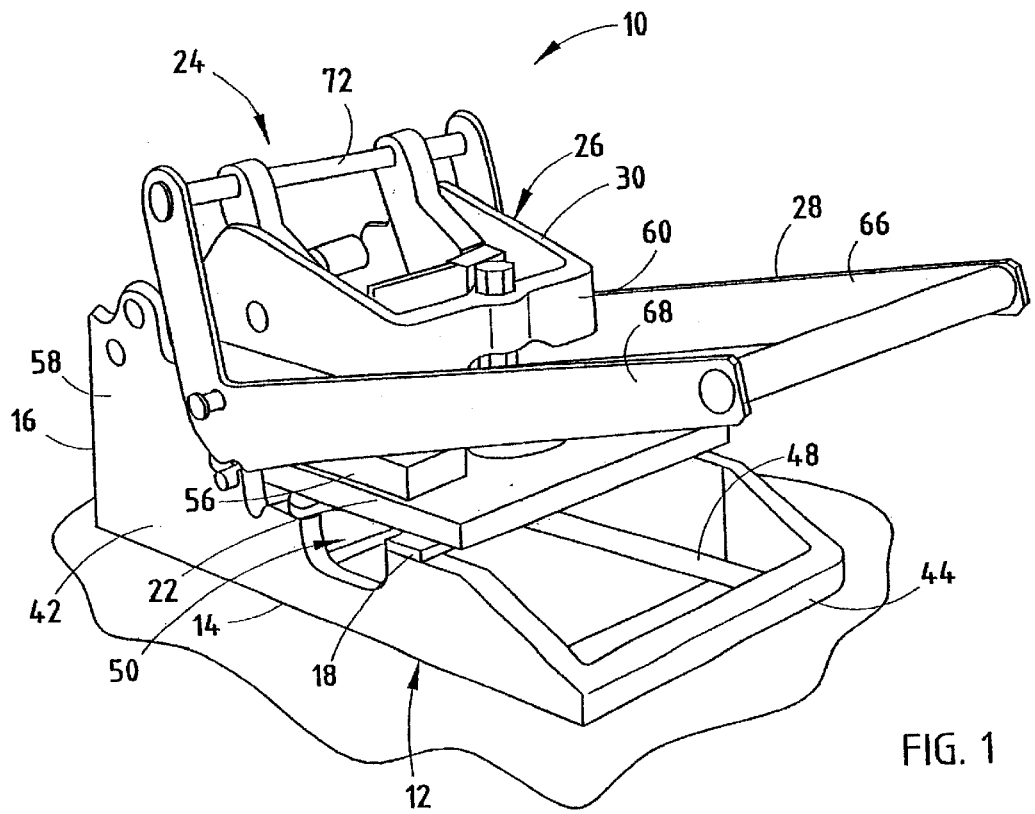
FIG. 1 is a top perspective view of a sealing apparatus embodying the present invention with a heating platen in a sealing position.
Figure 2:
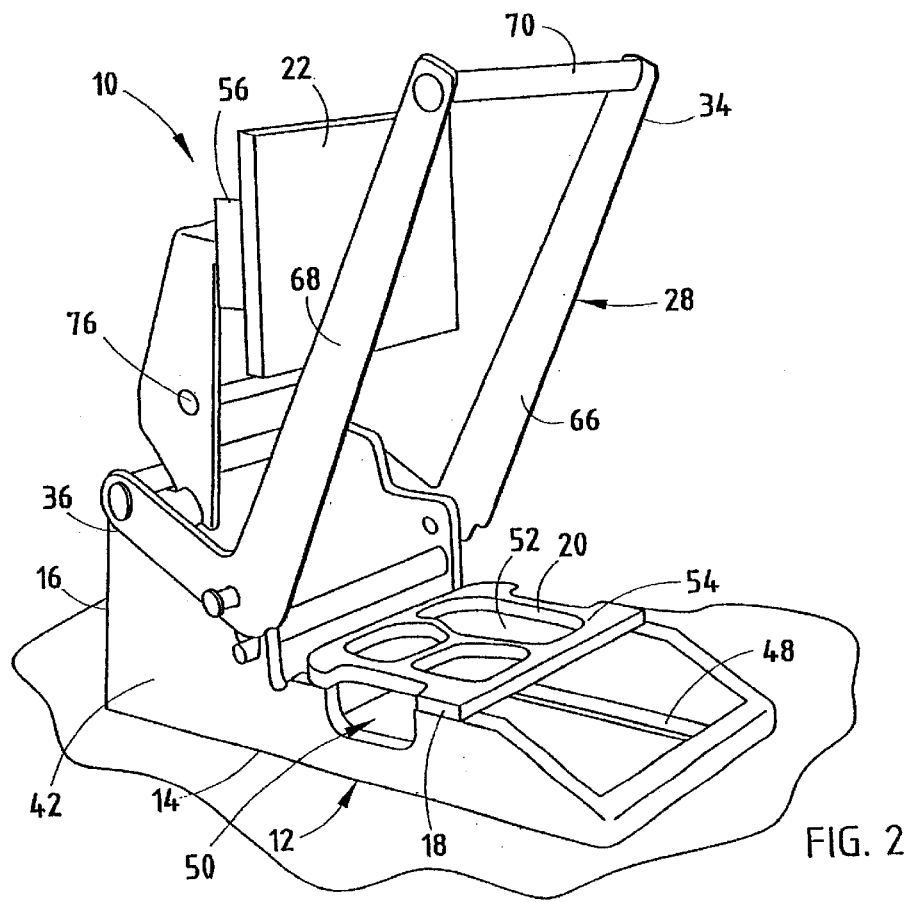
FIG. 2 is a top perspective view of the sealing apparatus with the heating platen in a load/unload position.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates the novel sealing apparatus of the present invention. The sealing apparatus 10 is shown having a fixed frame structure or support frame 12 that includes a base 14 and an actuator support 16 extending upwardly from base 14. The sealing apparatus 10 also includes a container support 18 (FIG. 2) that includes a container receiver 20 therein. The sealing apparatus 10 further includes a heater platen 22 suspended above container support 18 by actuator support 16. Heater platen 22 is shiftable between a load/unload position as shown in FIG. 2, wherein a container (not shown) can be loaded into and unloaded from within container receiver 20 and an associated lid (discussed below) can be positioned over the container, and a sealing position as shown in FIG. 1, wherein heater platen 22 presses the container and the lid on container support 18. Heater platen 22 is heated via an electrical heater 56 in thermal communication therewith. Sealing apparatus 10 still further includes an actuator 24 that includes a linkage 26 and an L-shaped handle 28. Linkage 26 includes a support structure 30 pivotally attached to support frame 12 at a pivot point 32 (FIG. 3) and supporting heater platen 22 as discussed below. The L-shaped handle 28 (FIG. 3) has a first end 34, a second end 36, and a pivot point 38 located between first end 34 and second end 36. Handle 28 is pivotable between a first position as shown in FIG. 2, wherein heater platen 22 is in the load/unload position and a second position as shown in FIG. 1, wherein heater platen 22 is in the sealing position. Actuator 24 (FIG. 4) further includes two pivot arms 40 pivotally linked to second end 36 of handle 28 and pivotally linked to support structure 30 such that rotating handle 28 with respect to support frame 12 shifts heater platen 22 between the load/unload position and the sealing position.

Figure 5:
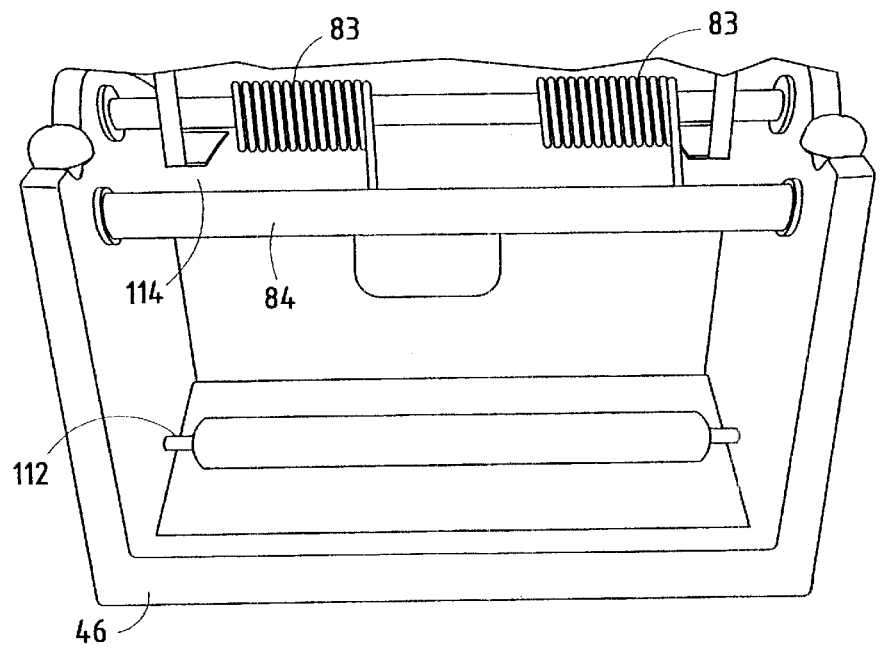
FIG. 5 is a fragmentary rear perspective view of the sealing apparatus.

Support frame 12 includes side walls 42, a front wall 44 and a rear wall 46 (FIG. 5). Support frame 12 also includes a plurality of support members 48 extending between side walls 42, front wall 44 and rear wall 46, thereby structurally supporting the same. Side walls 42 each include a notched sections 50 that allow an operator of sealing apparatus 10 access to an underside of the containers when the containers are placed within container receiver 20 of container support 18.

Container receiver 20 of container support 18 defines a desired number of container receiving cavities 52, shown here to be three, each cavity 52 being surrounded by a peripheral ledge 54. When a container having a peripheral shape like that of the cavities 52 is placed within container receiver 20, its peripheral, horizontal flange will rest on peripheral ledge 54 around cavity 52.

Figure 3:
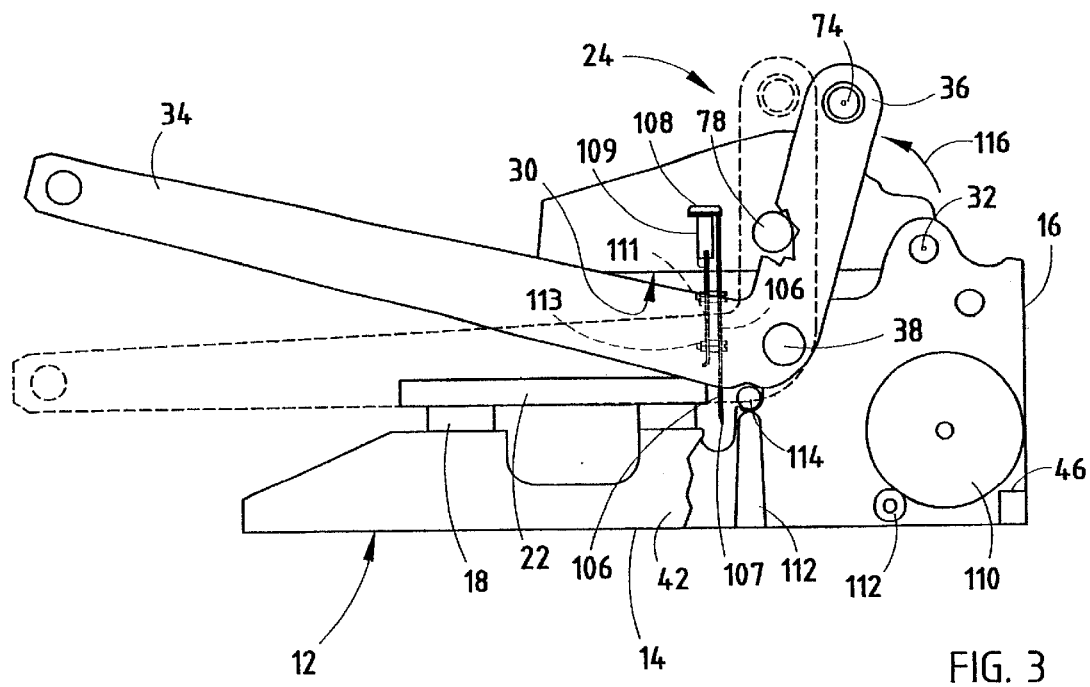
FIG. 3 is a side elevational view of the sealing apparatus with the platen in the sealing position, an actuator handle in a second position, and the handle in a third position shown in phantom.
Figure 4:
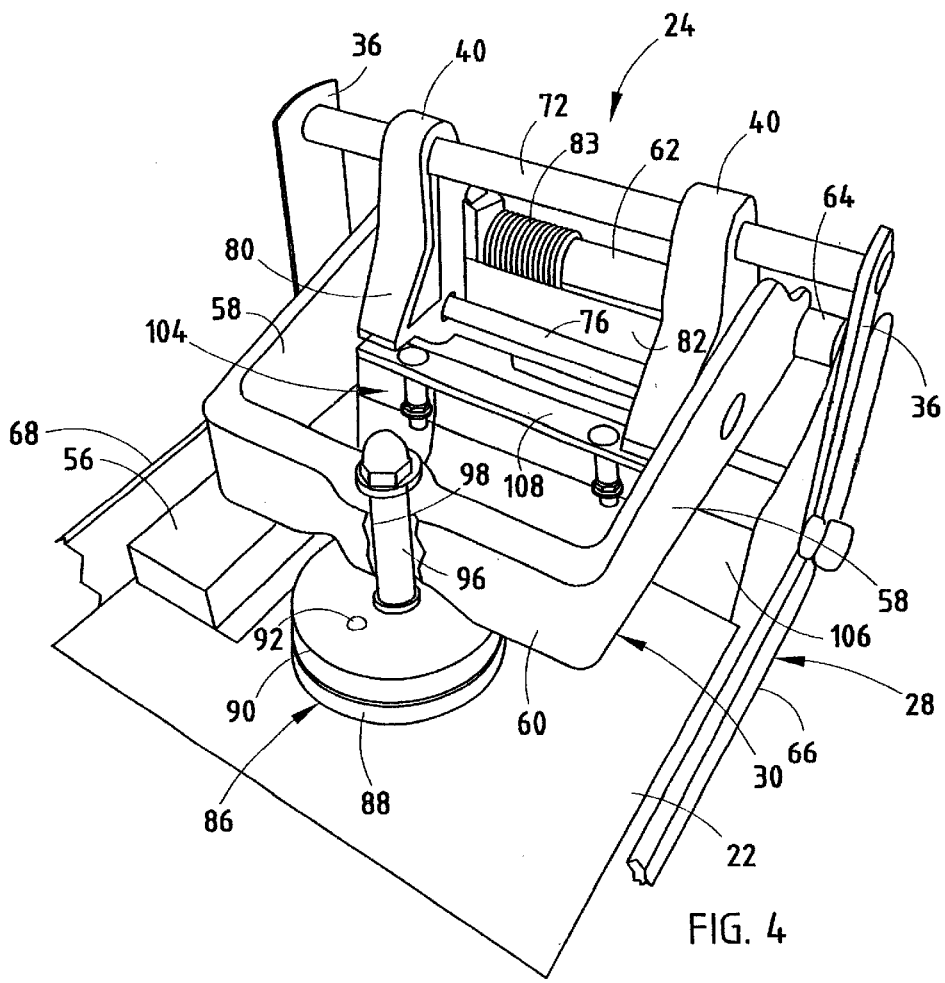
FIG. 4 is a top perspective view of an actuator.

Support structure 30 of actuator 24, as best shown in FIG. 4, is provided a box-like shape and includes side walls 58 and a front wall 60. Support structure 30 is pivotally attached to a pivot shaft 62 that extends through side walls 58 and which defines pivot point 32 (FIG. 3). A pair of spacers 64 prevent support structure 30 from traveling linearly along pivot shaft 62. Support structure 30 is actuated through an arcuate path by actuator 24, as discussed below.

Handle 28 includes a first half 66 and a second half 68 juxtaposed across support frame 12. First half 66 and second half 68 of handle 28 are attached by a tubularly shaped gripping section 70 at first end 34, and by a pivot shaft 72 that defines a pivot point 74 at second end 36.

Pivot arms 40 are pivotally attached to handle 28 via pivot shaft 72, and are also pivotally attached to support structure 30 via a pivot shaft 76 that extends between and is fixedly attached to side walls 58 of support structure 30. Pivot shaft 76 defines a pivot point 78. Pivot arms 40 each include a substantially triangularly shaped forwardly extending actuator arm 80. A pair of coil springs 83 are concentrically located about pivot shaft 62 and engage a center wall 82 extending between side walls 58 of support structure 30, and also engage a bar 84 (FIG. 5) extending between side walls 42 of support frame 12. Coil springs 83 are adapted to bias heater platen 22 towards the load/unload position as discussed below.

Figure 6:
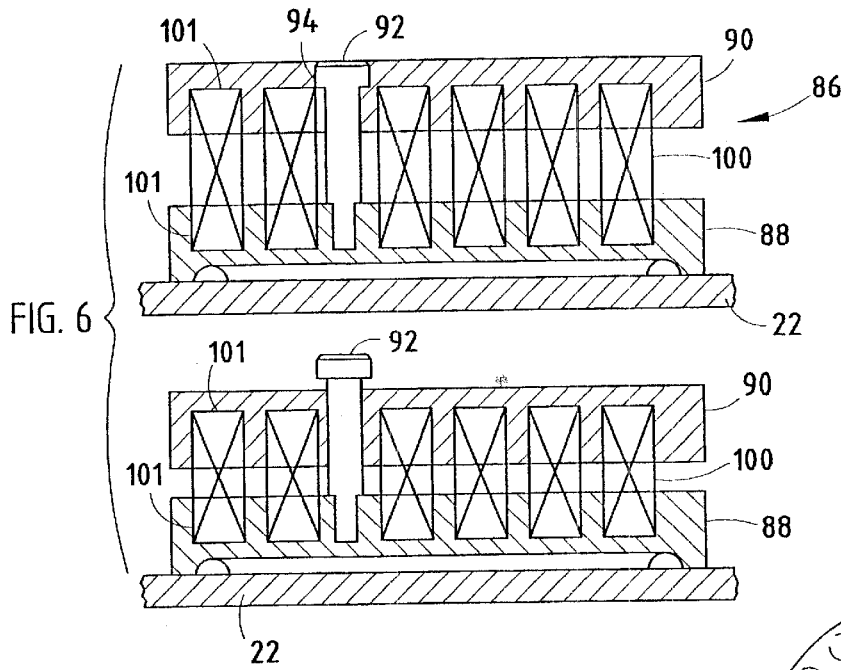
FIG. 6 is a cross-sectional view of a leveling assembly of the sealing apparatus shown in an up and down position.
Figure 7:
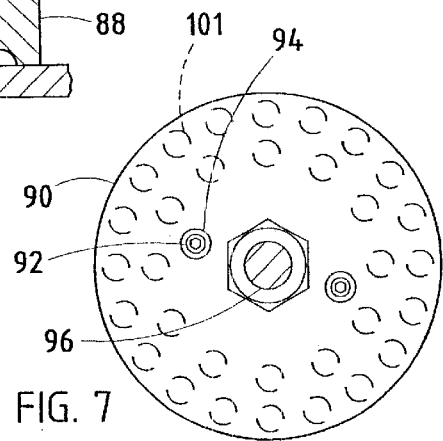
FIG. 7 is a top plan view of the leveling assembly of the sealing apparatus.

Actuator 24 further includes a leveling assembly 86 (FIGS. 4 and 6). Leveling assembly 86 includes a lower plate 88 fixedly attached to heater platen 22, and upper plate 90 by a pair of bolts 92 that loosely fit within a pair of apertures 94 within upper plate 90 and are threadably engaged within lower plate 88. Upper plate 90 is connected to front wall 60 of support structure 30 by a bolt 96 located within an aperture 98 that extends through front wall 60 of support structure 30. A plurality of springs 100 are located within a plurality of recesses 101 within plates 88 and 90 and bias plates 88 and 90 away from one another. In the example illustrated in FIG. 7, springs 100 are placed in two concentric, circular patterns, however, springs 100 may be placed between plates 88 and 90 in other arrangements. Because plates 88 and 90 are flexibly joined by bolts 92 that loosely fit within apertures 94 of plate 90, upper plate 88 and lower plate 90 may move into non-parallel positions relative to one another, and "rock" as needed to allow heater platen 22 to seek and obtain a parallel relationship with the container flange and lid.

The plurality of springs 100 create the only force exerted on lower plate 88 and hence, heater platen 22. Therefore, downward pressure of actuator 24 creates a balanced pressure by all portions of heater platen 22 against all portions of the tray and lid even when upper plate 90 and lower plate 88 are not parallel, since lower plate 88 can rock (i.e. pivot or swing) as necessary to always seek a parallel relationship to container support 18 and a container flange and lid thereon due to the manner in which it is suspended from upper plate 90 and actuator 24. This ability of heater platen 22 to rock enables heater platen 22 to place uniform pressure on all parts of the flange and contacting lid areas.

As shown in FIGS. 3 and 4, sealing apparatus 10 includes a cutter assembly 104 which travels in a vertical linear path. Cutter assembly 104 includes a vertically oriented cutter plate 106, an actuator plate 108 that extends linearly along a top edge of cutter plate 106, a pair of springs 109, and a shroud 111. A plurality of bolts 113 connect cutter plate 106 with shroud 111. Spring 109 biases cutter plate 106 in an upward direction. In operation, actuator arms 80 of pivot arms 40 contact actuator plate 108 of cutter assembly 104, thereby overcoming the biasing force of springs 109 on cutter plate 106 moving cutter plate 106 linearly downward such that cutting edge 107 contacts and cuts the lid material as discussed below. Shroud 111 also serves to protect the operator from exposure to cutter plate 106.

In the example illustrated in FIGS. 3 and 5, the lid used in conjunction with the containers is provided in the form of a roll of heat sealable material 110. A support rod 112 extends between side walls and support frame 12 and supports roll 110 in cooperation with rear wall 46 of support frame 12. A gripping rod 114 extends between and is rotationally supported by side walls 42 of support frame 12. Gripping rod 114 is covered with a plyable polymeric material such as a foam adapted to grip the heat sealable material when in contact therewith. Gripping rod 114 is in close proximity with a center wall 115 that extends between side walls 42 of support frame 12 such that the heat sealable material is held in close contact with gripping rod 114.

In operation, handle 28 is moved into a first position, as shown in FIG. 2, and wherein heater platen 22 is located in the load/unload position. When located within the load/unload position, heater platen 22 is in a circumstantially vertical orientation and is well removed from the area surrounding the container receiver 20 and container support 18, thereby allowing easy access thereto and reducing the chances of the operator accidentally touching heater platen 22. After moving handle 28 to an open position, the operator then loads a tray or container into container receiver 20 of container support 18 and pulls a portion of the heat sealable material from between gripping rod 114 and center wall 115 until the heat sealable material covers the container located within container receiver 20. The operator then moves handle 28 to the second position, as shown in FIG. 1, wherein heater platen 22 contacts the heat sealable material and presses the heat sealable material and the container into contact with container support 18. Handle 28 pivots about pivot point 38 as handle 28 is moved between the first position and the second position, thereby causing second end 36 of handle 28 to move in an arcuate direction 116. As second end 36 of handle 28 moves in arcuate direction 116 pivot arms 40 are forced to pivot about pivot axis 74 and pivot axis 78, thereby placing a downward force on pivot shaft 76 and support structure 30 causing support structure 30 to pivot about pivot axis 32. Actuator 24 is located at its naturally corresponding fulcrum point when handle 28 is located at the second position and heater platen 22 first contacts container support 18, thereby eliminating the necessity for a constant downward pressure being exerted on handle 28 to maintain contact between heater platen 22 and container support 18, and necessitating an upward pressure on handle 28 to release actuator 24 and return handle 28 to the first position. When in the second position, the force being exerted on handle 28 is multiplied by actuator 24 as it is transferred to heater platen 22. In the illustrated example, a total downward force of approximately 14 to 20 pounds is required to move handle 28 from the first position to the second position, and results in heater platen 22 exerting approximately 500 pounds per square inch of pressure on container receiver 28 when handle 28 is located in the second position. This locking feature of sealing apparatus 10 allows an operator to "lock" heater platen 22 into the sealing position for a required dwell time, while eliminating the necessity of applying a constant force to handle 28. Handle 28 is moved into a third position shown in phantom line in FIG. 4, thereby causing actuator 24 to move beyond its fulcrum point. Moving the handle 28 to the third position causes actuator arms 80 of pivot arms 40 to contact actuator plate 108 of cutter assembly 104, thereby overcoming the biasing force of spring 109 on cutter plate 106 causing cutting edge 107 to cut the lid material from roll 110.

The container located within container receiver 20 is removed by moving handle 28 from the third position through the second position and to the first position, thereby allowing easy access to the container and dramatically decreasing the possibility of accidental contact with heater platen 22. The operator then accesses the bottom of the container located within the container receiver 20 by reaching through notched sections 50 within side walls 42 and below container support 18, pressing the container upwardly from within the container receiver 20 and removing the container therefrom.

The above description is considered that of the preferred embodiments only. Modifications of the invention will occur to those skilled in the art and those who make or use the invention. Therefore, it is understood that the embodiments shown in the drawings and described above are merely for illustrated purposes and not intended to limit the scope of the invention, which is defined by the following claims as interpreted according to the principles of patent law, including the doctrine of equivalents.

The invention claimed is:

1. A sealing apparatus, comprising:
   a frame including a base and an actuator support,
   a container support including a container receiver immovably fixed to the frame;
   a heater platen operably connected to the frame, the heater platen shiftable between a load/unload position wherein a container can be loaded into and unloaded from within the contain receiver and an associated lid can be positioned over the container, and a sealing position wherein the heater platen presses the container and the lid on the container support; and
   an actuator including a linkage adapted to receive an input force and to generate an output force, the linkage mechanically linked to the platen and the actuator support and configured such that the output force of the linkage is received by the platen causing the platen to apply a force against the container support that is at least five times the amount of the input force exerted on the actuator.

2. The sealing apparatus as defined in claim 1, wherein the platen is substantially vertically oriented when in the load/unload position.

3. The sealing apparatus as defined in claim 2, wherein the platen moves in an arcuate path between the load/unload position and the sealing position.

4. The sealing apparatus as defined in claim 3, wherein the actuator is manually actuated.

5. The sealing apparatus as defined in claim 4, wherein the actuator includes a handle shiftable between a first position, wherein the handle is positioned to allow easy access to the container receiver and the heater platen is in the load/unload position, and a second position, wherein the heater platen is in the sealing position.

6. The sealing apparatus as defined in claim 1, wherein the platen moves in an arcuate path between the load/unload position and the sealing position.

7. The sealing apparatus as defined in claim 1, wherein the actuator is manually actuated.

8. The sealing apparatus as defined in claim 7, wherein the actuator includes a handle shiftable between a first position, wherein the handle is positioned to allow easy access to the container receiver and the heater platen is in the load/unload position, and a second position, wherein the heater platen is in the sealing position.

9. The sealing apparatus as defined in claim 8, wherein the handle locks in the second position, thereby eliminating the necessity of providing a constant force to the handle to keep the heater platen in the sealing position.

10. The sealing apparatus as defined in claim 1, wherein the actuator includes at least one biasing mechanism that biases the heater platen to the load/unload position.

11. The sealing apparatus as defined in claim 10, wherein the biasing mechanism includes a coil spring.

12. The sealing apparatus as defined in claim 1, wherein a roll of heat sealable material is supported by the frame, and wherein the roll is used as the lid for the container.

13. The sealing apparatus as defined in claim 12, wherein the handle restricts a movement of the heat sealable material when the handle is pivoted beyond the second position.

14. The sealing apparatus as defined in claim 13, wherein a guide spindle guides the heat sealable material, and wherein the handle contacts the guide spindle, thereby restricting the movement of the heat sealable material.

15. The sealing apparatus as defined in claim 1, wherein a roll of heat sealable material is supported by the frame, and further including a cutter mechanically linked to the actuator such that the cutter cuts the heat sealable material when the heater platen is in the sealing position.

16. A sealing apparatus, comprising:

a frame;

a container support including a container receiver;

a heater platen;

a linkage operably connecting the heater platen to the frame such that the platen is shiftable between a load/unload position wherein a container can be loaded into and unloaded from within the contain receiver and an associated lid can be positioned over the container, and a sealing position wherein the heater platen presses the container and the lid on the container support, wherein the linkage is adapted to receive an input force and to generate an output force, the linkage having a mechanical advantage such that the platen applied a force against the container support that is at least five times the amount of the input force.

* * * * *

UNITED STATES PATENT AND TRADEMARK OFFICE
CERTIFICATE OF CORRECTION

PATENT NO. : 6,681,546 B2
DATED : January 27, 2004
INVENTOR(S) : DeYoung et al.

It is certified that error appears in the above-identified patent and that said Letters Patent is hereby corrected as shown below:

Column 1,
Line 12, delete "ABN".

Column 4,
Line 7, delete "a".

Column 6,
Line 50, "contain" should be -- container --.

Column 8,
Line 21, "contain" should be -- container --.
Line 27, "applied" should be -- applies --.

Signed and Sealed this

Fifteenth Day of June, 2004

JON W. DUDAS
*Acting Director of the United States Patent and Trademark Office*